United States Patent [19]

Bailet et al.

[11] 4,369,012

[45] Jan. 18, 1983

[54] DEVICE FOR TIGHTENING OR BLOCKING OF AN OBJECT ON A ROD

[75] Inventors: Jean-Claude Bailet, Villefranche-sur-Mer, France; Rocco De Bella, Ventimiglia, Italy

[73] Assignee: Siamp Cedap Reunies, Monaco, Monaco

[21] Appl. No.: 97,796

[22] Filed: Nov. 26, 1979

[51] Int. Cl.³ .............................................. F16B 37/08
[52] U.S. Cl. ..................................... 411/437; 411/265
[58] Field of Search .............. 411/437, 435, 265, 512, 411/511, 516; 24/255 R, 256

[56] References Cited

U.S. PATENT DOCUMENTS 1,705,811  3/1929  Eidel, Jr. .............................. 411/437
2,149,719  3/1939  Arnest .................................. 411/437
2,885,758  5/1959  Russo et al. ......................... 24/255 R Primary Examiner—Ramon S. Britts
Attorney, Agent, or Firm—Karl F. Ross

[57] ABSTRACT

An element adapted to engage a rod is composed of a tough synthetic-resin material and is tubular so as to receive the rod. Relatively long slots opening at one end of the element are aligned with relatively short slots opening at the opposite end of the element so that the opposite end of the element is formed with jaws which can be spread apart when members defined between the long slots are pressed together in a pincer movement. The inner surfaces of the jaws are provided with formations engageable with complementary formations on the rod.

8 Claims, 9 Drawing Figures

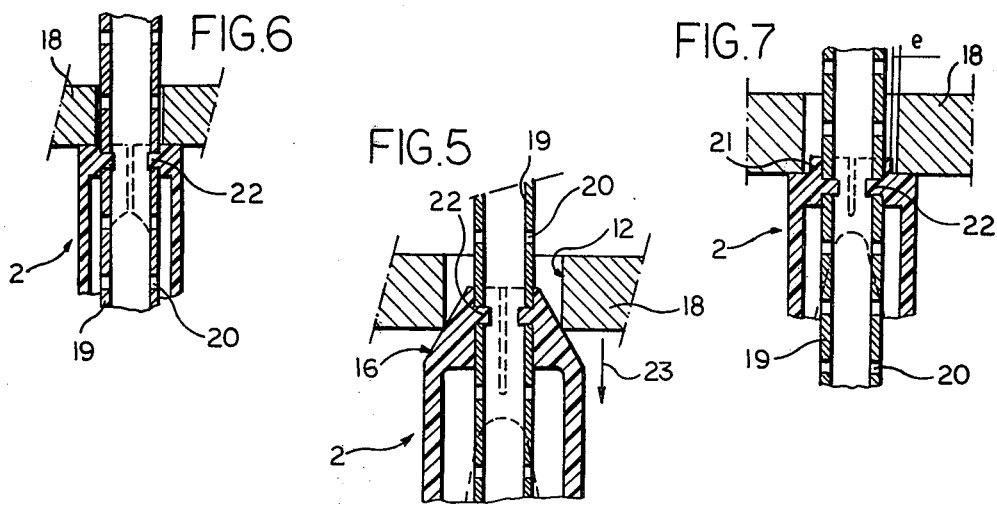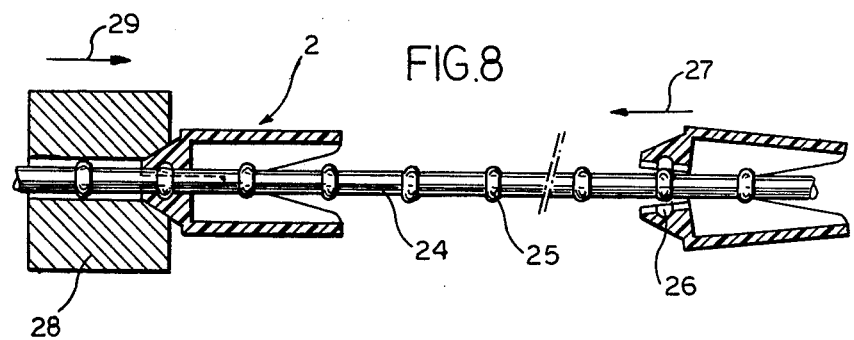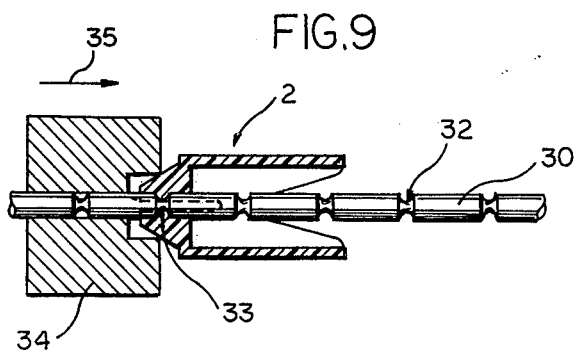

DEVICE FOR TIGHTENING OR BLOCKING OF AN OBJECT ON A ROD

FIELD OF THE INVENTION

The present invention is a device for the tightening or blocking securing of an object on a rod.

BACKGROUND OF THE INVENTION

The fastening of an object on a support is frequently brought about with the aid of a device utilizing a screw and a nut.

This is the case especially for the fastening of a toilet seat (cover) on a water closet (bowl). In this case, the device contains a threaded rod whose head bears on the fixed part of the seat, traverses it, and then goes through a hole which is cut in the bowl. A nut is screwed on the threaded rod, which in turn goes on to press on the bottom side of the bowl, thus fixing of the assembly.

The inconvenience of such a process is the fact that the maneuvers required for screwing are difficult due to bad accessibility to the parts which have to be handled.

OBJECT OF THE INVENTION

The present invention aims to remedy these disadvantages.

SUMMARY OF THE INVENTION

For this purpose, the related device is formed of an element which is made of a tough and elastic substance. It delimits a hollow volume which can be traversed by the considered rod. This element presents two pairs of longitudinal slots symmetric in relation to a longitudinal median plane. Each pair of slots has a relatively large slot and a relatively narrow slot; the extensions of one and the other are separated by a bridge of the substance. The two bridges of the same substance correspond to the two pairs of slots being equally symmetric in relation to the above-mentioned plane. The end of the element on the side of the narrow slots is equipped with means for hooking it to the rod, which has a complementary profile. The section of the opening between the hooking means, corresponds, while the device is at rest, to the section of the rod on which the object should be secured.

The element, according to the invention, advantageously made from a synthetic substance (resin) forms, therefore, a kind of pincers which are able to deform and capable of returning to their initial position, due to the effect of the elasticity of the substance. When the user presses between his two fingers the side of the element in which the large slots are cut, the following is accomplished: the lips on both sides of the smaller slots are forced to spread, and the means by which the element is hooked onto a rod is in open position. This open position permits the element to slide freely on the rod. When the pressure exercised on the element is relaxed, the two lips situated on the side of the narrow slots resume their initial position by drawing closer together in such a manner that their hooking means unite anew with the rod, thus securing the element on the rod.

In order to facilitate the working of the device, the length of the large slots is greater than the length of the narrow slots. The deformation thus obtained results in a strong couple. The amount of effort exercised by the user is of minimal importance.

According to the first form of construction of the invention, the hollow element has an axial tapping (thread) on the side where the narrow slots are located.

In this case the element according to the invention is a screw nut. This screw nut permits a fast approach by spreading apart the lips in which the tapping is cut. The end of the element then comes to press on the object to be tightened or to be blocked.

When the element abuts against this object, it closes the pincers by relaxing the pressure exercized upon the element. This pressure is such that the tapping of the element meshes with the thread of the rod. Then, blocking is effected by rotating the element relative to the threaded rod in a manner of a traditional screw.

According to another embodiment, the hollow element has, on the side where the narrow slots are cut, parts that protrude inward.

The rod or the tube associated with the hollow element has notches which permit it to engage with the protruding parts which emerge inward from the lips of the element. The rod is pushed forward to its proper place by opening the pincers of the element. Then, when the rod or tube is in the desired position, its notches engage with the protruding parts of the hollow element. In this case the device serves essentially as a stop to block an object, the recesses being formed in the rod instead of the element.

According to another embodiment of the invention, the hollow element has recesses on the side where the narrow slots are located.

In this case, the rod or the tube on which the element is engaged presents bulges which can be covered by the recesses that are cut into the lips of the element, in order to assure the positioning of the latter.

Accordingly one characteristic in all embodiments previously cited can be seen: the part of the element in which the narrow slots are cut, are of a truncated form; the small base is located on the side of the free end; and the large base is located on the side of the bridges of the substance, connecting with the part in which the large slots are cut.

In this case it is suitable that the object to be tightened or to be blocked has an opening for the passage of the rod; and the dimension of this opening is determined by the maximal and minimal spans of the truncated portion of the hollow element.

In this way the truncated span is engaged in this opening. This is what limits the separation of the lips of the element and consequently entirely prevents accidental deblocking of the device. This form results in a selftightening which increases in proportion as the screwing effort with a screw with a rapid approach. This truncated form justifies itself likewise by the self-tightening which occurs when a force is exercised on the element by the pulling of a load which it supports.

For example: in the applications concerning bearing pullers, wall clamps or the support for pipes. It is not necessary to use this truncated part as a simple stop or support, in which case a flat or cylindrical frontal form placed on the shoulder will suffice. In this case it is the protruding portions of the part or of the support which secures the hold for moderate forces or weights. For larger forces or weights the cylindrical front part engages itself in the opening of the object to be supported or to be placed in a desired position in a manner to prevent the accidental opening of the pincers.

BRIEF DESCRIPTION OF THE DRAWING

In any case, the invention will be better understood with the aid of the description which follows in reference to the attached schematic drawing. With the aid of nonrestrictive examples, several embodiment of this device are presented:

FIGS. 5 through 9 are the sectional views of variants of construction of this device.

SPECIFIC DESCRIPTION

Figure 1:
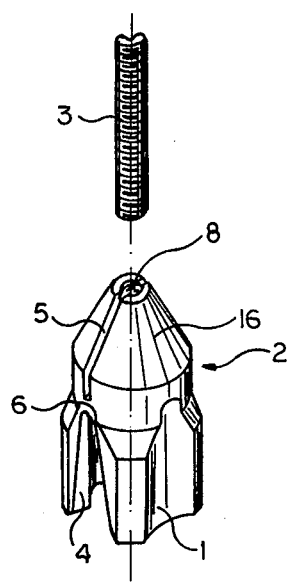
FIG. 1 is a perspective view of a first embodiment of this device.

The device represented in FIGS. 1 through 4 includes an element 2 constructed of a tough elastic synthetic substance (resin). This element delimits a hollow volume permitting its engagement on a threaded rod 3. This element has two pairs of longitudinal slots symmetrical with respect to a longitudinal median plane. Each pair of slots has a slot 4 relatively large and a slot 5 relatively narrow, both extending along the same line but separated by a bridge of the substance 6. The two bridges of the substance 6 correspond to the two pairs of slots being equally symmetrical in relation to the above-mentioned plane.

The slots 4 are larger than the slots 5. The end situated on the side of the slots 4 has two surfaces 7 profiled in the form of a pusher. The end situated on the side of the narrow slots 5 forms two lips pointed inwards in which an axial tapping (thread) is made 8, allowing screwing on the threaded rod 3.

Figure 2:
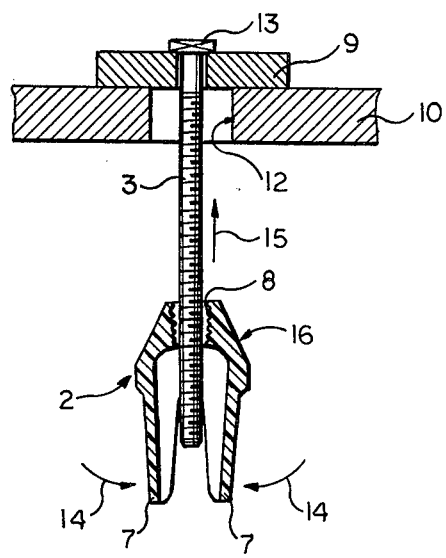
FIGS. 2 through 4 are three sectional views of this device corresponding to the three phases of securing a toilet seat to the bowl of a water closet.
Figure 3:
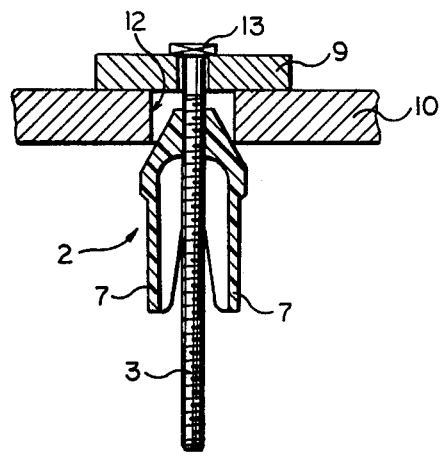
Figure 4:
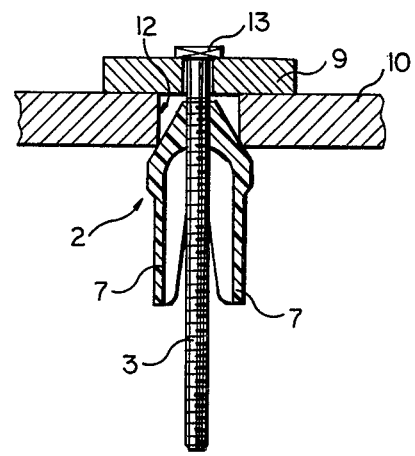

The utilization of this element 6, which forms a quick tightening screw nut is made explicit by referring to FIGS. 2 through 4, which present the tightening of a toilet seat (cover) 9 of a water closet 10. The threaded rod 3 is engaged with the seat 9 passing through it in the usual manner, before going through an opening 12 made in the bowl 10. The head 13 of the threaded rod 3 presses on the seat 9.

The user exerts a pressure on the two pushers 7 according to the arrow 14, and it is this force which causes the opening of the lips in which the tapping 8 is cut. From this fact, it is possible, as shown in FIG. 2, to cause a rapid approach of the element 2 according to arrow 15 without having to do any screwing.

It is to be noted that in the present case the part situated on the side of the slots 5 has an external surface 16 of a truncated shape. While the surface 16 contacts the edges of the opening 12 of the bowl, as shown in FIG. 3, it proceeds to relax the pressure exerted on the pushers 7. The tapping 8 returns then to grip with the threaded rod 3. It proceeds then, as shown in FIG. 4, to be screwed in the usual manner through rotation of the element 2 according to arrows 17 on the threaded rod, in order to block the assembly.

The FIGS. 5 through 9 correspond to the embodiments of the device in which the element 2 does not play the role of a tightening screw, but constitutes a stop which permits the blocking of the retention of a part mounted on a tube or rod.

FIG. 5 represents positioning of a part 18, on a tube 19. For this purpose the tube is shown to have notches 20 at regular intervals. The part of the element 2 situated on the side of the narrow slots 5 has two protrusions 22 on the internal side of its lips. The element 2 is at first positioned by engaging its protruding parts 22 with the notches 20 which are situated on the selected level on the tube 19.

Then part 18 is fastened into place by shifting the latter in the direction at arrow 23 until it comes to press on the truncated surface 16 of the element 2.

FIG. 6 concerns a construction variant of the device pictured in FIG. 5, in which the pressure surface of the element 2 is not truncated but flat, corresponding to a plane that is transversal to the axis. In this case it is the protrusions 22 which assure the holding action by engaging with the notches 20. This arrangement is suitable for the bearing of moderate forces or weights.

FIG. 7 corresponds to another construction variant of the device. According to this the anterior side of the element 2 has a central cylindrical shoulder 21 which is able to enter inside the opening 12 of the part 18. The lateral clearance e, between the shoulder 21 and the opening 12, is smaller than the length of the protruding parts 22.

This prevents the pincers of the element 2 from opening sufficiently under the effect of relatively strong forces, which might result in allowing the protrusions 22 to slip out of the tube 19.

The FIGS. 8 and 9 correspond to two variants of construction of this second device.

FIG. 8 represents the blocking of the element 2 on a rod 24 which has bulges 25. For this purpose the lips of the element 2 have recesses 26 of a form that is complementary to the bulges 25. The positioning of the element 2 is achieved by opening the lips as is shown on the right portion of FIG. 6, and shifting the element in the direction of arrow 27. When the element 2 is in the desired position, the pressure exerted on the pushers is relaxed, and the recesses 26 couple with one of the bulges 25 on the rod 24. The part 28 to be retained is then brought into contact with the element 2 by shifting it along the rod in the direction of arrow 29.

In the case of the form of construction represented in FIG. 9, a rod 30 is shown to have a series of recesses 32. The element 2 has bulges 33 on its lips which point inward. The bulges are designed to be engaged in one of the recesses 32, in order to achieve the blocking of a part 34 mounted and then slid on the rod 30 in the direction of arrow 35.

It is evident from what has already been stated, that the invention brings a great improvement over the known assemblies by furnishing a device of a simple concept, of a very practical use and fit for multiple applications. Thus, in addition to the application of fastening toilet seats (covers) of a water closet indicated previously, this device can be utilized, for example, in the following domains:

to quickly mount and dismount elements in the joinery of wood, plastic or metal;

to quickly mount and dismount clamps for batteries;

to quickly fasten and adjust cleats for shelves;

as a block stop or as an end stop for a threaded, perforated or notched shaft;

to rapidly fasten and adjust tie rods, for example, on extractors of ball bearings, rings, etc.

in building: the application of fastening rods, tie beams, supports for false ceilings, cable tracks, piping for mounting and rapid leveling etc.

It is evident that the invention is not limited only to one form of construction of the device described above in the list of examples; to the contrary, it embraces all variants of construction. Therefore it should be noted that if the element 2 is advantageously made from a synthetic substance, it should be also quite possible to make it from other materials, provided that they permit an elastic deformation on the level of the bridge substance 6.

We claim:

1. A securing device, comprising a rod and an elongated hollow element composed unitarily of a tough elastic material and traversed longitudinally and centrally by said rod, said element being formed with a first pair of relatively large longitudinal slots terminating at one end of the element and a second pair of relatively narrow longitudinal slots terminating at the opposite end of said element, each of the slots of one pair being aligned with but separated from a slot of the other pair by a resilient bridge of said material whereby said bridges flank said rod, the aligned slots being disposed symmetrically with respect to a median longitudinal plane through said element whereby the relatively large slots define between them a pair of manually engageable members of a pincer adapted to be pressed together to spread jaws formed between the slots at said other end, said jaws being formed internally with formations generally transverse to the axis of said rod and complementary to formations provided on said rod whereby, upon release of said members, the formations on said jaws engage the hook upon said rod to secure said element against axial movement on said rod.

2. The device defined in claim 1 wherein the lengths of said large slots is greater than the lengths of said narrow slots.

3. The device defined in claim 1 or claim 2 wherein said jaws are formed internally with screwthread formations adapted to mesh with an external thread on said rod whereby, upon release of said members, said element can be screwed along said rod.

4. The device defined in claim 1 or claim 2 wherein said jaws have inwardly protruding formations engageable in complementary recesses in said rod.

5. The device defined in claim 1 or claim 2 wherein said jaws are formed with hollows engageable with complementary bulges formed on said rod.

6. The device defined in claim 1 or claim 2 wherein the end of said element forming said jaws is provided with a frustoconical external surface tapering away from said members.

7. The device defined in claim 6 wherein the broad base of the frustocone coincides substantially with the regions at which said bridges are formed on said element.

8. The device defined in claim 1 or claim 2 wherein said other end of said element has a generally flat axial face disposed transversely to the axis of the element.

* * * * *